Aug. 11, 1953 C. W. FITZGERALD 2,648,444
TIMBER SETTING MACHINE
Filed Nov. 26, 1948 11 Sheets-Sheet 1
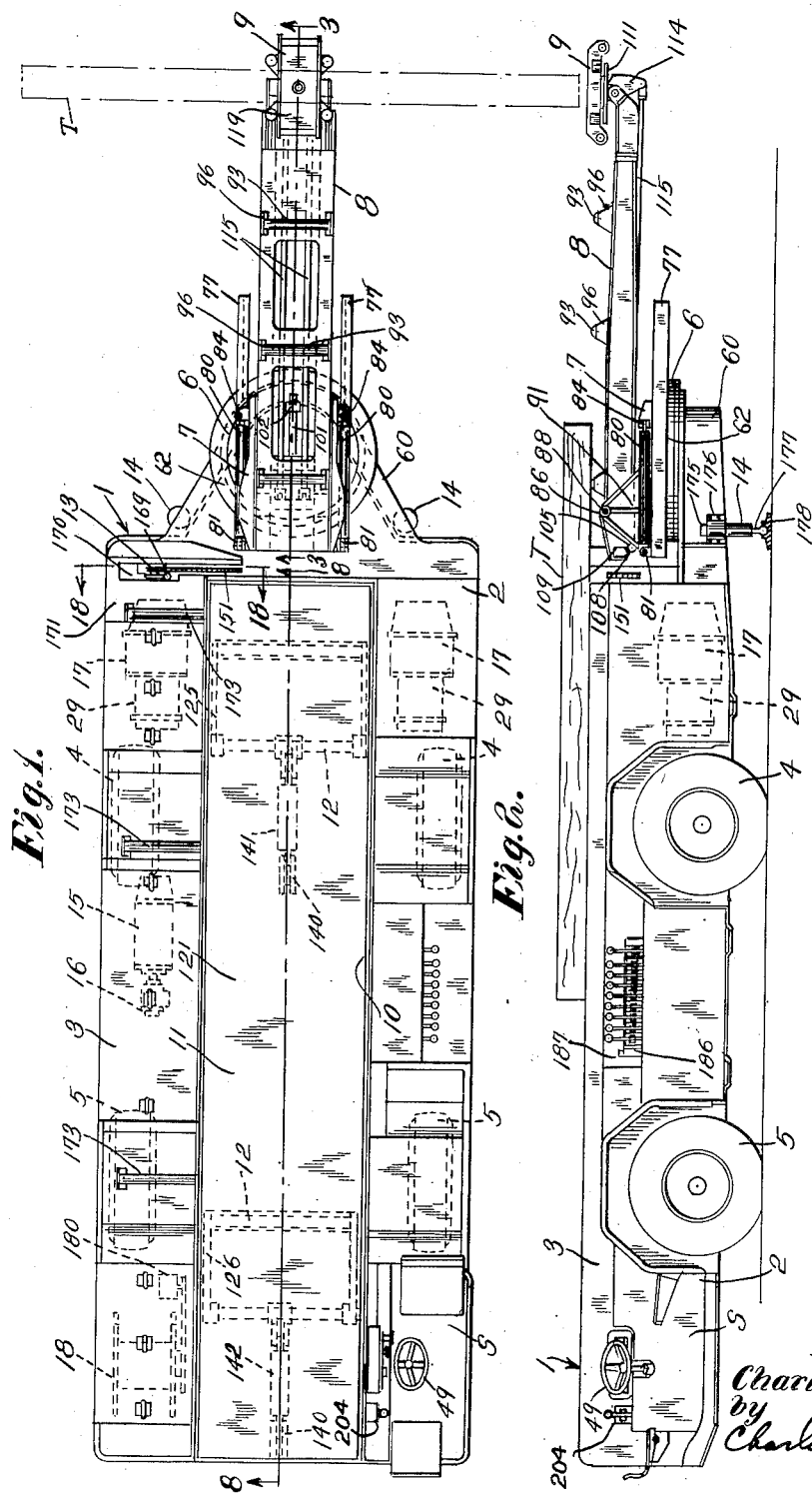
Inventor:
Charles W. Fitzgerald
by
Charles F. Ogard,
Attorney.

Aug. 11, 1953     C. W. FITZGERALD     2,648,444
TIMBER SETTING MACHINE
Filed Nov. 26, 1948     11 Sheets-Sheet 2
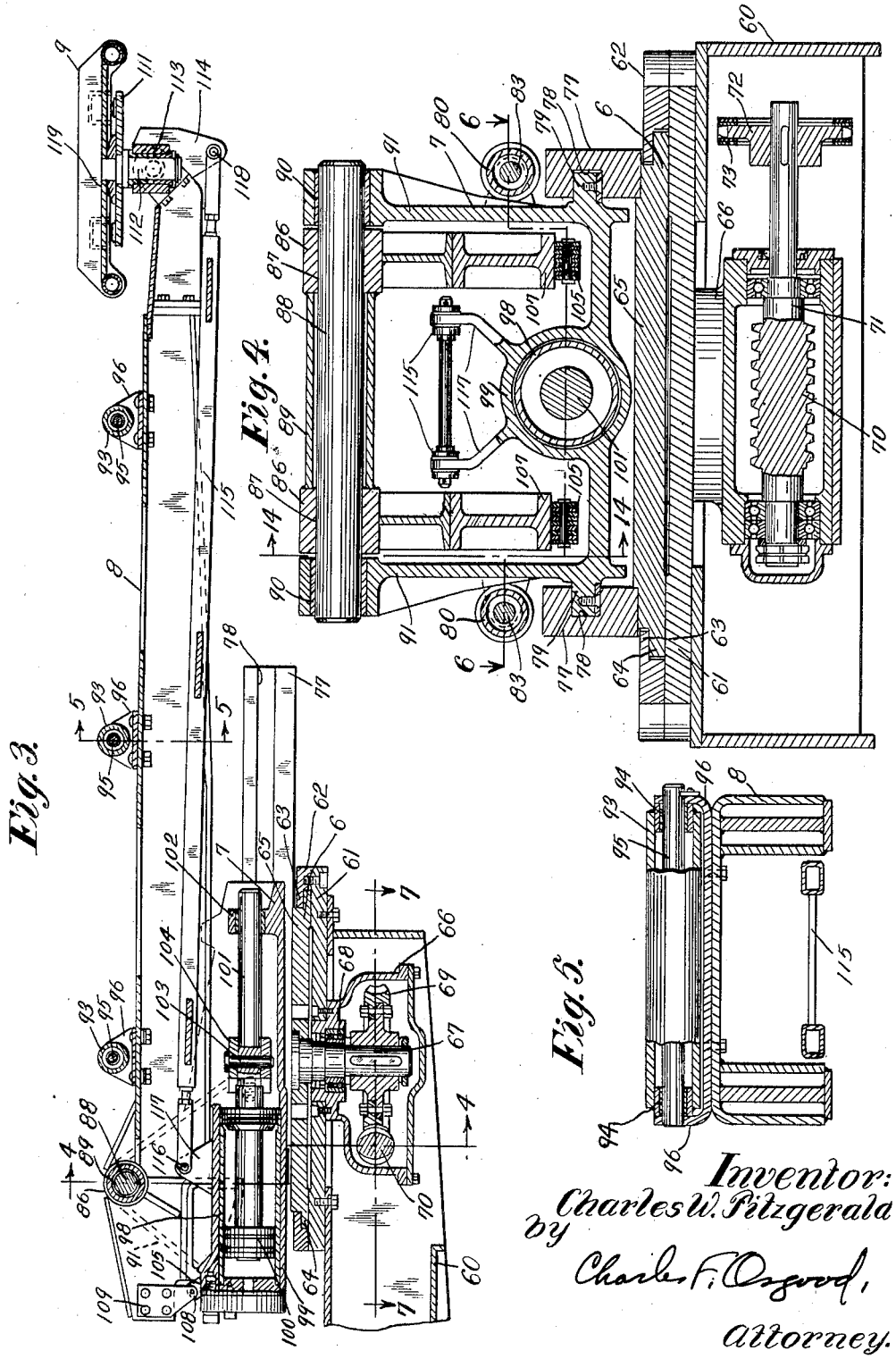
Inventor:
Charles W. Fitzgerald
by Charles F. Osgood,
Attorney.

Aug. 11, 1953 C. W. FITZGERALD 2,648,444
TIMBER SETTING MACHINE
Filed Nov. 26, 1948 11 Sheets-Sheet 3

Inventor:
Charles W. Fitzgerald.
by Charles F. Osgood,
Attorney.

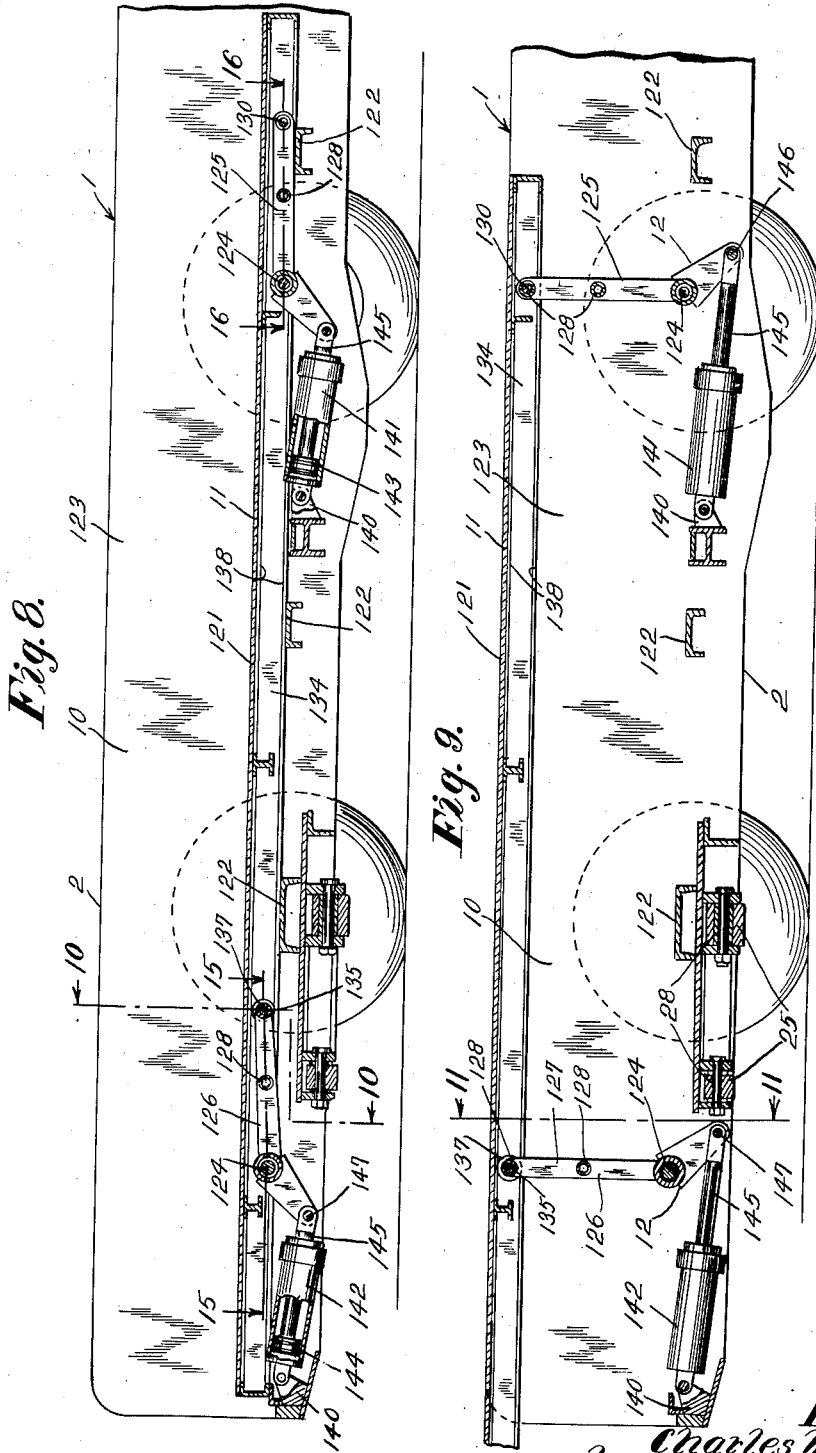

Aug. 11, 1953 C. W. FITZGERALD 2,648,444
TIMBER SETTING MACHINE
Filed Nov. 26, 1948 11 Sheets-Sheet 5
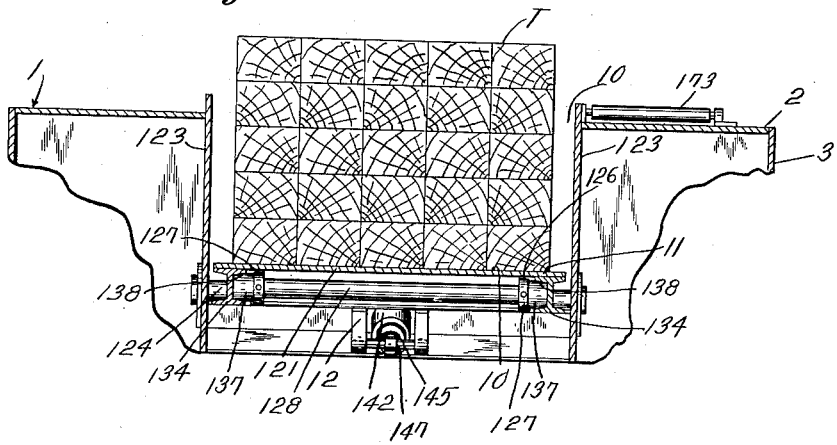
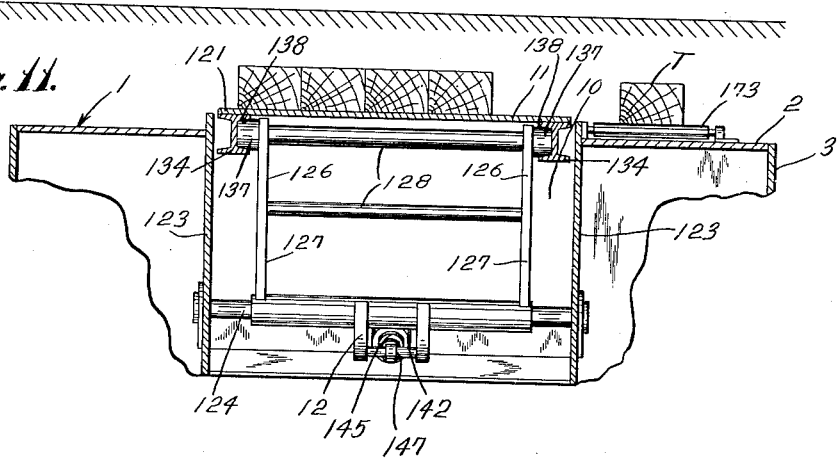
Inventor:
Charles W. Fitzgerald.
by Charles F. Osgood,
Attorney.

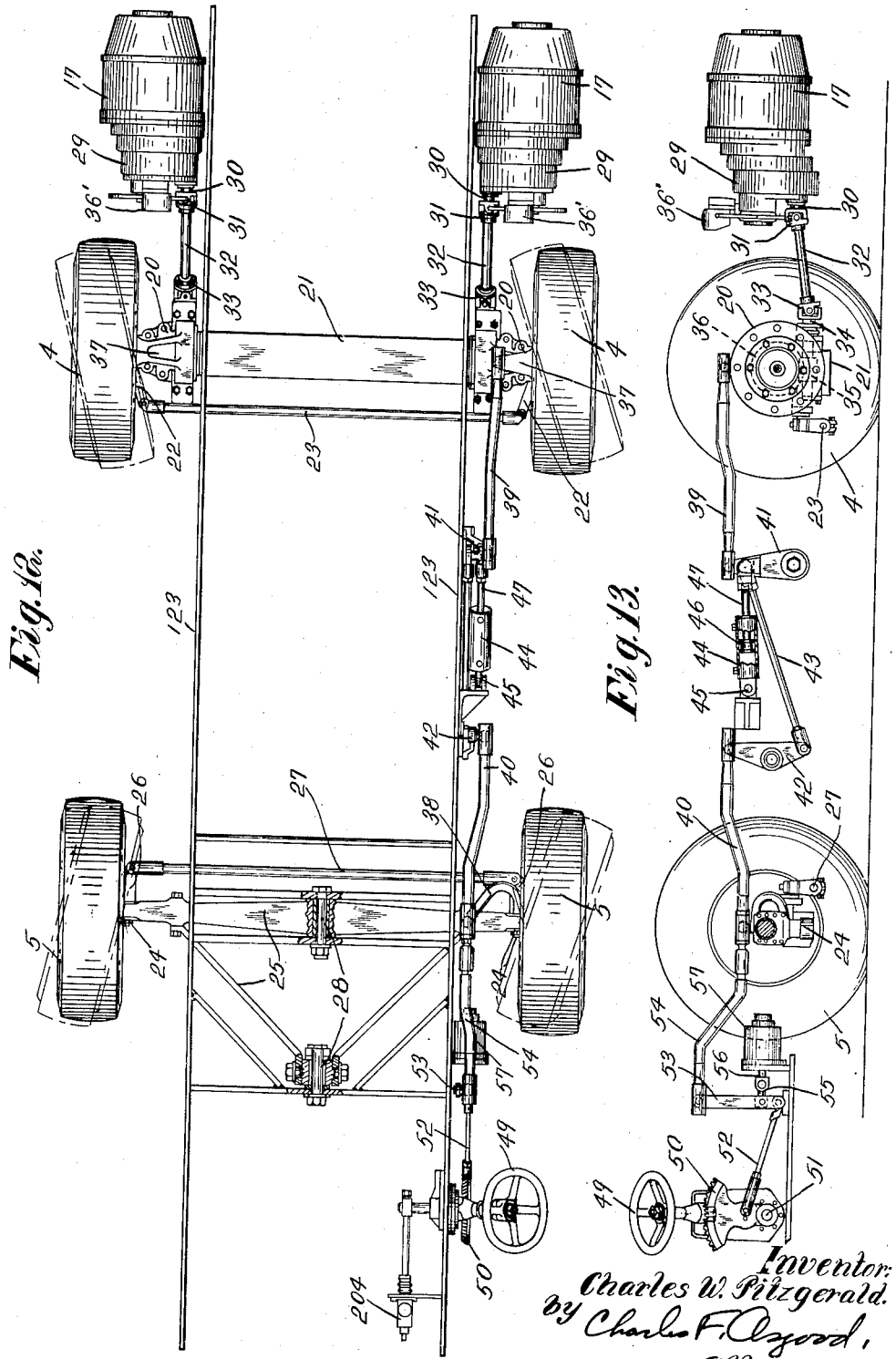

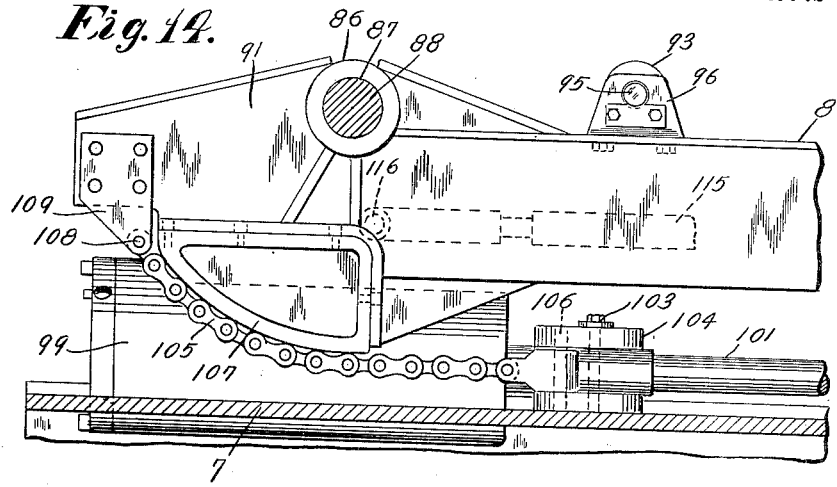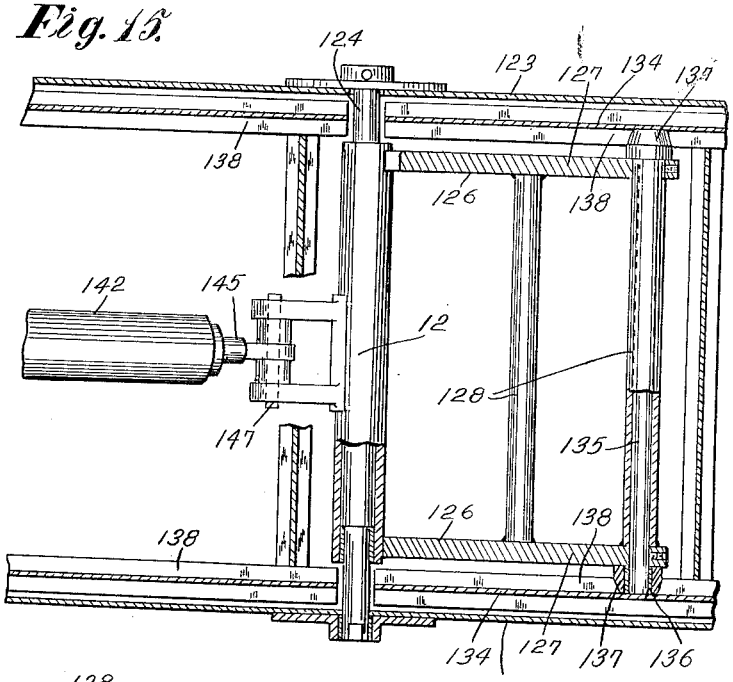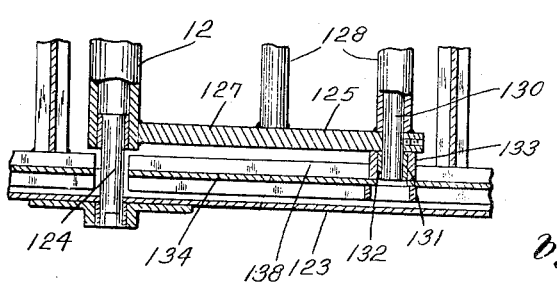

Aug. 11, 1953  C. W. FITZGERALD  2,648,444
TIMBER SETTING MACHINE
Filed Nov. 26, 1948  11 Sheets-Sheet 8

Inventor:
Charles W. Fitzgerald.
by Charles F. Osgood,
Attorney.

Aug. 11, 1953  C. W. FITZGERALD  2,648,444
TIMBER SETTING MACHINE
Filed Nov. 26, 1948  11 Sheets-Sheet 9

Inventor:
Charles W. Fitzgerald.
by Charles F. Osgood,
attorney.

Fig. 22.

Aug. 11, 1953  C. W. FITZGERALD  2,648,444
TIMBER SETTING MACHINE
Filed Nov. 26, 1948  11 Sheets-Sheet 11
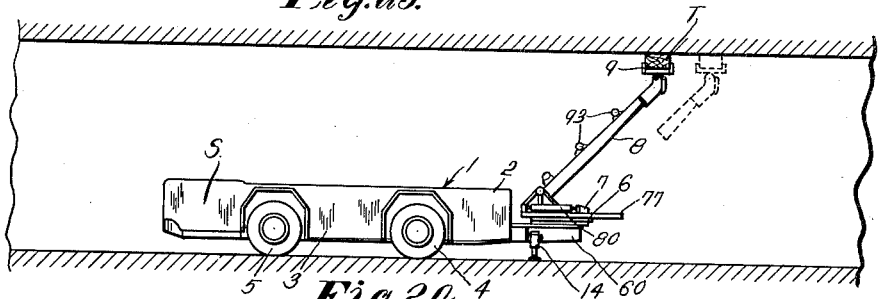
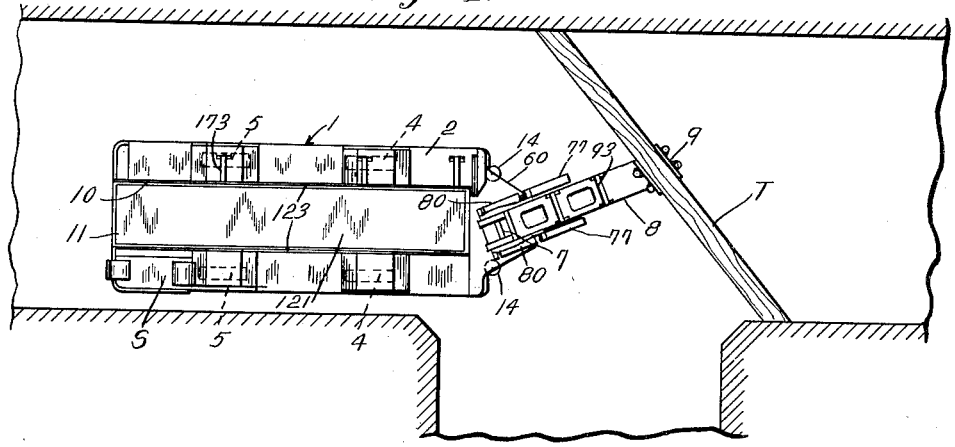
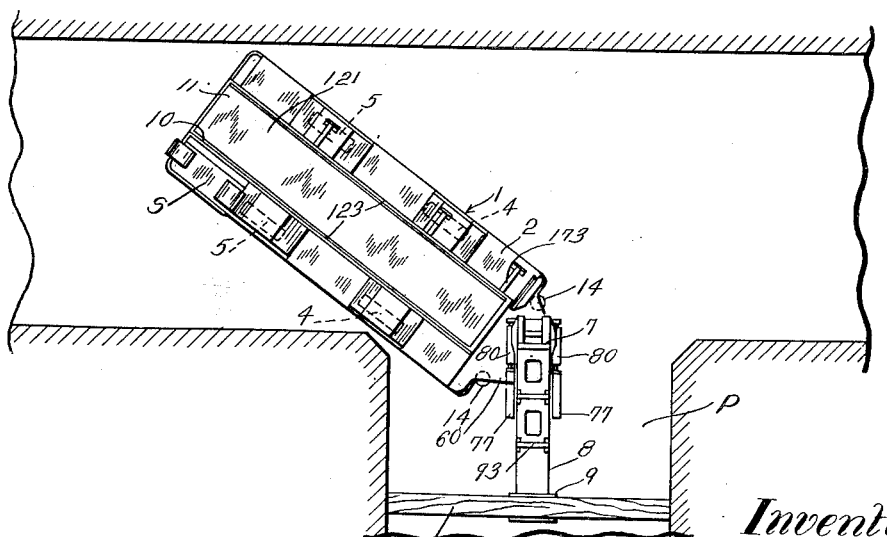
Inventor:
Charles W. Fitzgerald.
by Charles F. Osgood.
Attorney.

Patented Aug. 11, 1953

2,648,444

UNITED STATES PATENT OFFICE 2,648,444

TIMBER SETTING MACHINE

Charles W. Fitzgerald, Franklin, Pa., assignor to Joy Manufacturing Company, Pittsburgh, Pa., a corporation of Pennsylvania Application November 26, 1948, Serial No. 62,100

18 Claims. (Cl. 214—1)

This invention relates to timber setting machines, and more particularly to an improved machine for transporting roof timbering elements such as cross timbers and props, for sawing the roof props to the proper length, and for setting the cross timbers against the roof of a mine or tunnel.

In mining and tunnelling operations, it is common practice to set cross timbers against the roof as the work advances to support the roof against falls or cave-ins, and the cross timbers are usually held in position by upright timbers or props. The props are usually sawed to proper length, and the cross timbers are manually lifted into place against the roof and held there as the props are set in place, an arduous and extremely dangerous task. In known instances, timber setting machines have been provided for transporting the timbering elements, for sawing the props to the proper length and for setting the cross timbers in place against the roof. The present invention contemplates improvements over such known machines in that improved means is provided for transporting the roof timbering elements, for sawing the uprights or props to the proper length, and for raising and holding the cross timbers in place against the roof during setting of the uprights or props, thereby to perform the several timber setting operations with comparatively little effort on the part of the operator and his helpers and minimizing the danger. The machine of the present invention embodies a mobile base adapted to travel about the mine or tunnel and having a centrally located compartment of large capacity for receiving a load of roof timbering elements such as cross timbers and props, with the bottom of the compartment made adjustable and provided with power elevating devices whereby the timber load may be lifted with respect to the base so that the timbering elements may be easily disposed in position to be sawed and the cross timbers may be readily moved endwise from the compartment bottom along a boom type elevator onto the timber receiving saddle, and when the timber is properly positioned on the saddle the elevator boom may be swung upwardly to place and hold the cross timber against the roof. The machine of the present invention also embodies a novel saw mechanism and improved means for supporting and guiding the timbering elements with respect to the saw of the mechanism whereby the timbering elements may be readily cut to proper prop lengths. Moreover, in the machine of the present invention, the pivoted elevator boom which carries the saddle is mounted to swing horizontally about an upright axis with respect to the base and to be shifted rectilinearly in a horizontal direction so that a cross timber may be easily positioned at the desired location with respect to the roof. Also, in a machine of the present invention, the propelling and steering means for the machine is improved whereby not only may the machine be effectively propelled, but also may be easily steered through the sharply curved passageways of an underground mine or tunnel. Further, the machine of the present invention is of an extremely low and compact design well adapted to use in mines or tunnels having low headroom, and is provided with a novel fluid system and fluid operated adjusting and controlling devices whereby the machine may be conveniently and easily operated and controlled, and with comparative safety, in the restricted spaces encountered in underground mines or tunnels. The machine also has improved means for operating and adjusting the elevator boom and for positioning the timbers for movement onto the saddle of the elevator boom.

An object of the present invention is to provide an improved timber setting machine. Another object is to provide an improved timber setting machine having improved means for transporting a load of roof timbering elements, for sawing the timbering elements to proper length, and for elevating and setting in place the cross timbers against the roof. A further object is to provide an improved timber setting machine embodying improved means for lifting the load of timbering elements with respect to the sawing and elevating means of the machine whereby the timbering elements may be easily placed in sawing position and in a position to be moved onto the elevating means. Yet another object is to provide an improved timber setting machine having a mobile base provided with a large compartment for receiving a load of roof timbering elements and improved means for lifting the compartment bottom whereby the load of timbers may be readily positioned for convenient handling. Still another object is to provide improved means for positioning the cross timbers with respect to the roof and for elevating the cross timbers up against the roof and for holding them in place during setting thereof. A still further object is to provide an improved timber setting machine embodying a swingable boom type elevator which carries the timber receiving saddle, together with improved means for horizontally positioning the saddle as the timber thereon is elevated and placed against the roof. Another object is to provide an improved timber elevator boom mounted on a horizontally shiftable support carried by a turntable, together with improved means for swinging the elevator boom, for shifting the horizontal support, and for rotating the turntable, whereby a timber supported on the saddle of the elevator boom may be adjusted through a wide range thereby to facilitate positioning of the timber with respect to the roof. Still another object is to provide an improved timber lifting device, together with improved power operated devices for effecting the lifting function and embodying means for levelling and tilting the lifting device. A still further object is to provide an improved timber setting machine having improved fluid operated devices for effecting various adjustments and controls of the machine, together with an improved fluid system and associated control valve means. Another object is to provide an improved timber setting machine having novel arrangements and combinations of parts. These and other objects and advantages of the invention will, however, hereinafter more fully appear.

In the accompanying drawings there is shown for purposes of illustration one form which the invention may assume in practice.

In these drawings:

Fig. 1 is a plan view of a timber setting machine constructed in accordance with an illustrative embodiment of the invention.

Fig. 2 is a side elevational view of the machine shown in Fig. 1.

Fig. 3 is an enlarged view in longitudinal vertical section taken substantially on line 3—3 of Fig. 1.

Fig. 4 is an enlarged cross sectional view taken substantially on the planes of line 4—4 of Fig. 3.

Fig. 5 is a detail cross sectional view taken on line 5—5 of Fig. 3.

Fig. 8 is an enlarged view in longitudinal vertical section taken substantially on line 8—8 of Fig. 1, with the compartment bottom in lowered position.

Fig. 9 is a sectional view taken on the plane of Fig. 8, showing the compartment bottom in raised position.

Fig. 10 is a fragmentary cross sectional view taken on line 10—10 of Fig. 8.

Fig. 11 is a fragmentary cross sectional view taken on line 11—11 of Fig. 9.

Fig. 12 is a schematic plan view showing the propelling and steering mechanism, which embodies two-wheel drive and four-wheel steering.

Fig. 13 is a side elevational view of the mechanism shown in Fig. 12, with the near wheels omitted.

Fig. 14 is a detail vertical sectional view taken on line 14—14 of Fig. 4.

Fig. 15 is an enlarged horizontal section taken on line 15—15 of Fig. 8, illustrating details of the timber lifting device.

Fig. 16 is an enlarged fragmentary section taken on line 16—16 of Fig. 8.

Fig. 22 is a diagrammatic view showing the hydraulic fluid system and associated control valve means.

Figs. 23, 24 and 25 are diagrammatic views showing different operating positions of the timber setting machine in a mine passageway or tunnel.

Figure 6:
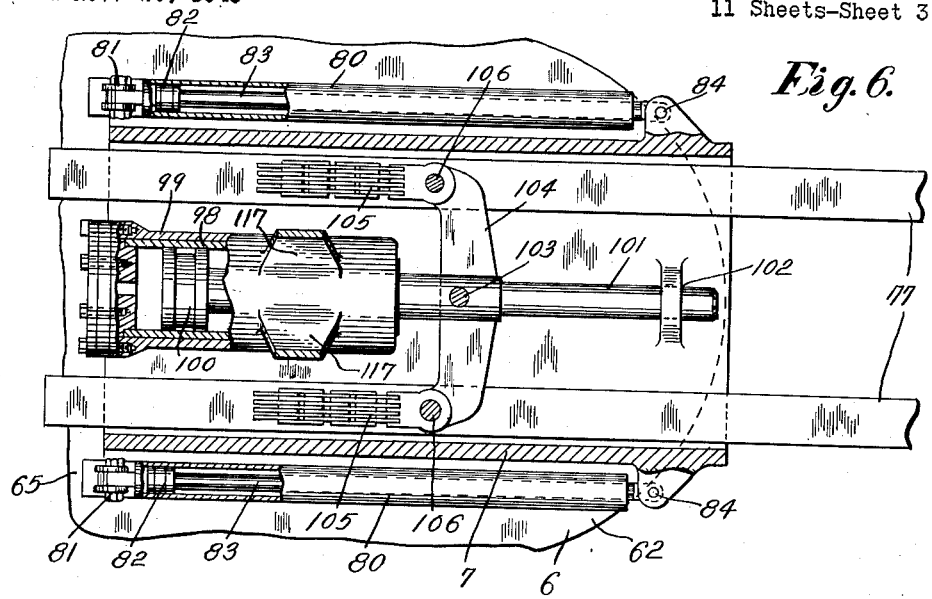
Fig. 6 is a horizontal sectional view, on a somewhat reduced scale, taken on the planes of line 6—6 of Fig. 4.

In the illustrative embodiment of the invention, as shown in the drawings, the improved timber setting machine generally designated 1 is an improvement over that disclosed and claimed in a copending application to one C. F. Ball, Ser. No. 61,177, filed November 20, 1948, and generally comprises a mobile base 2 having a low, compact frame 3 mounted on pairs of front and rear rubber-tired wheels 4, 4 and 5, 5. Supported at the front end of the base is a horizontal turntable 6 carrying a horizontal sliding support 7 on which a pivoted boom type elevator 8 is mounted to swing in vertical planes with respect to the sliding support and the turntable. Carried at the outer end of the elevator boom is a swivelled timber receiving saddle 9. Arranged centrally lengthwise of the base frame rearwardly of the elevator boom and turntable is a relatively large timber receiving compartment 10 adapted to receive a load of roof timbering elements, and the compartment bottom 11 cooperates with lifting means 12 for lifting the load of timbering elements in the compartment relative to the base to facilitate positioning of the timbering elements both with respect to a saw mechanism 13 and the elevator boom 8 and saddle 9. Stabilizer jacks 14 carried by the base frame are engageable with the floor below the elevator boom for providing a bottom brace for the latter during elevating and setting of a cross timber. An electric motor 15 drives a pump 16 for supplying liquid under pressure to the various hydraulically operated devices of the machine. Reversible electric motors 17, 17 drive the front wheels 4. A conventional hydraulically operated electric cable reel 18 arranged at the rear end of the base frame serves to conduct electric power to the motors 15 and 17.

Now referring to the detail structure of the propelling and steering mechanism of the machine, it will be noted that, as shown most clearly in Figs. 12 and 13, the front wheels 4 are journaled on swingable axle mountings 20, 20 pivoted on vertical axes at the ends of a transverse axle 21 rigidly secured to the base frame, and the swivelled axle mountings have arms 22 connected by a conventional tie rod 23 so that the front wheels may be swung in unison. The rear wheels 5 are journaled on swingable axle mountings 24 pivoted on vertical axes at the ends of a transverse axle 25, and the axle mountings have arms 26 connected by a conventional tie rod 27 so that the rear wheels may be swung in unison. The rear axle is pivoted at 28 at longitudinally spaced points on the base frame to rock about a longitudinal axis lying in the vertical center of the base. By the provision of the rocking rear axle, the machine may traverse an uneven floor surface without distortion of the frame of the base. The front wheels are propelling wheels, and are driven by the motors 17 each through a conventional speed reducer 29 which has its terminal shaft 30 coupled by a universal joint 31 to a transmission shaft 32. The shaft 32 at its rear end is coupled by a universal joint 33 to a longitudinal shaft 34 journaled within the adjacent axle mounting 20. Fixed to the shaft 34 within the mounting is a worm 35 meshing with a worm wheel 36 fixed to the axle to which the adjacent front wheel is secured. Thus the front wheels may be driven concurrently by the motors 17 irrespective of the swivelled position of the wheels. Conventional front wheel brakes 36', desirably of the hydraulically operated spot-disc type, are associated with certain elements of the speed reducers 29, and conventional hydraulically operated brakes are associated with the rear wheels for braking the latter, and a common control is provided for the brakes for concurrently braking the four wheels. Four-wheel steering is provided, and the swivel mountings 20 and 24 of the wheels at one side of the base have arms 37 and 38 connected by drag links 39 and 40 respectively to one end of levers 41 and 42 pivotally mounted on transverse axes at the adjacent side of the base frame. The front lever 41 is pivotally connected near the pivotal connection of the latter with its associated drag link 39 to a link 43 which is in turn pivotally connected to the lower end of the rear lever 42. A fluid cylinder 44 pivoted at 45 on a bracket secured to the adjacent side of the base frame contains a recriprocable piston 46 having its piston rod 47 pivotally connected to the upper end of the front lever 41 with its pivot alined with the pivotal connection of the link 43 with this same lever. Thus, when fluid is suitably supplied to the cylinder 44, the piston 46 may be moved to effect opposite swinging movements of the front and rear wheels in one direction or the other to turn the machine through a sharply curved path. To effect steering a steering wheel 49 located at the operator's tramming station S at the rear end of the machine is connected through a gear and gear segment to a steering arm 50 pivoted at 51 on the adjacent side of the base frame and connected by a pivoted rod 52 to the lower end of a lever 53. A drag link 54 connects the upper end of the lever 53 with the rear drag link 40. A link 55 pivotally connects the lever 53 with a stem 56 of a conventional control valve 57 which controls, as later explained, the flow of liquid under pressure to the opposite ends of the cylinder 44. Thus, by turning the steering wheel 49, liquid under pressure may be supplied to the steering cylinder 44 to effect turning of the four steering wheels in the desired direction, and the drag link 54 provides a mechanical connection between the steering wheel 49 and the steering gear, whereby under certain conditions the wheels may be manually turned to effect steering. By trapping liquid in the steering cylinder 44, the wheels may be held in the desired position of adjustment in an obvious manner.

Figure 7:
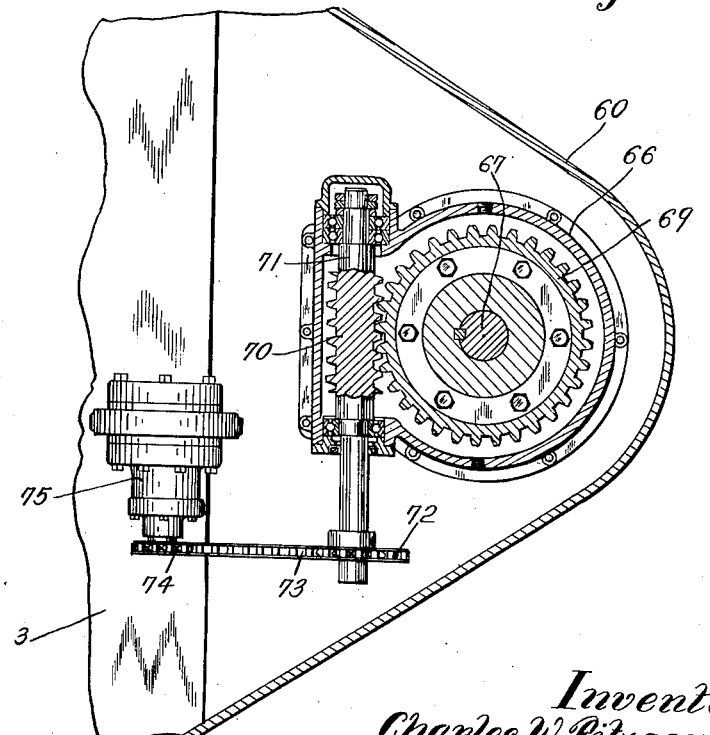
Fig. 7 is a horizontal sectional view taken on line 7—7 of Fig. 3, showing the turntable rotating mechanism.
Figure 17:
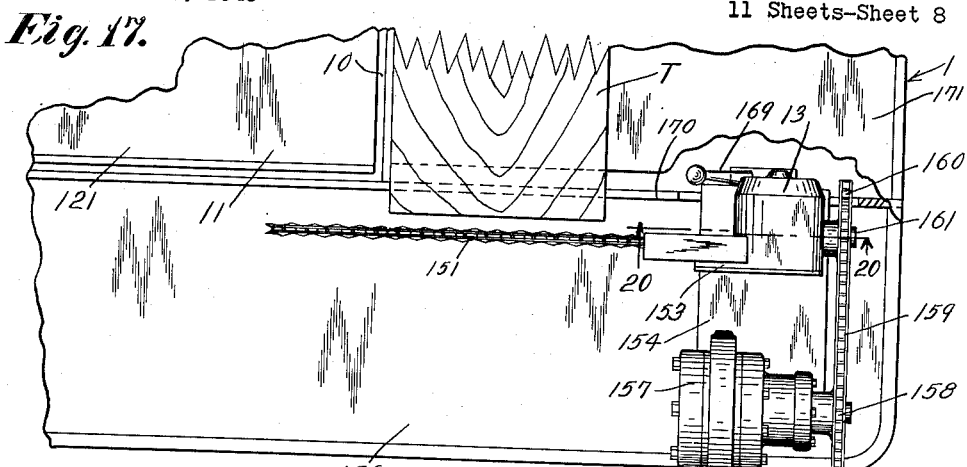
Fig. 17 is a fragmentary plan view, with the top plate partially broken away, illustrating the saw mechanism.
Figure 18:
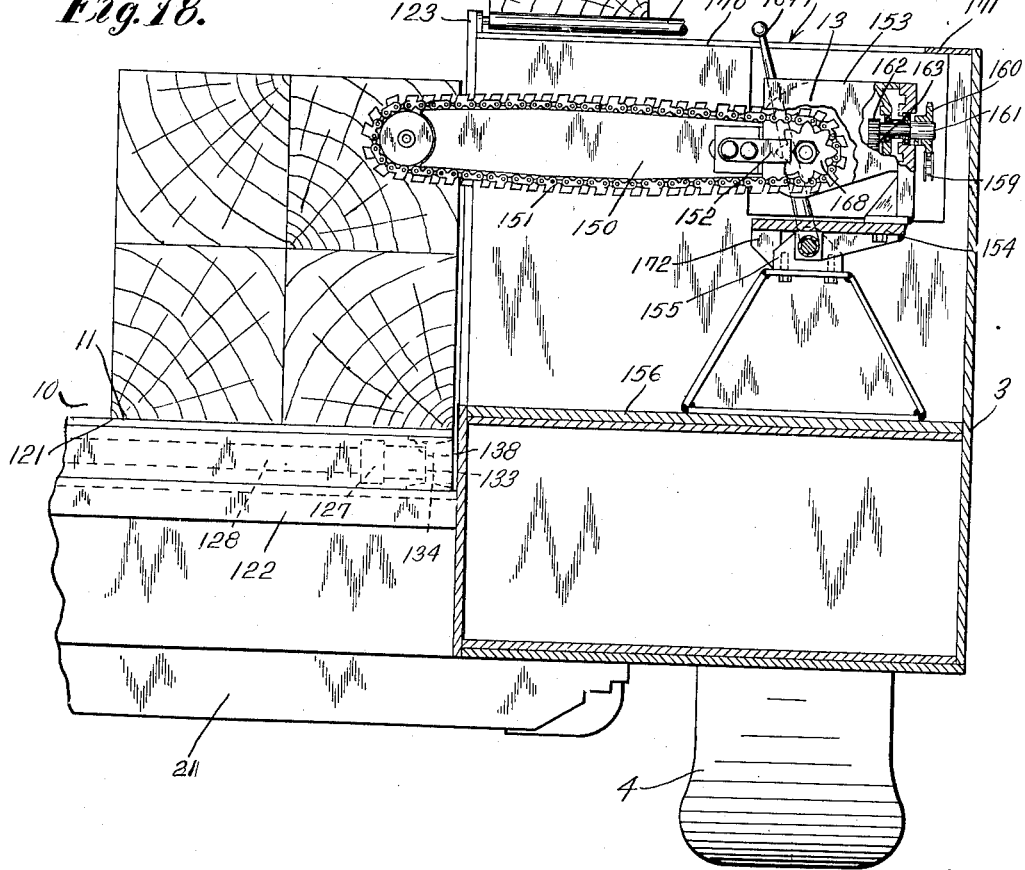
Fig. 18 is an enlarged vertical sectional view taken on line 18—18 of Fig. 1.
Figure 19:
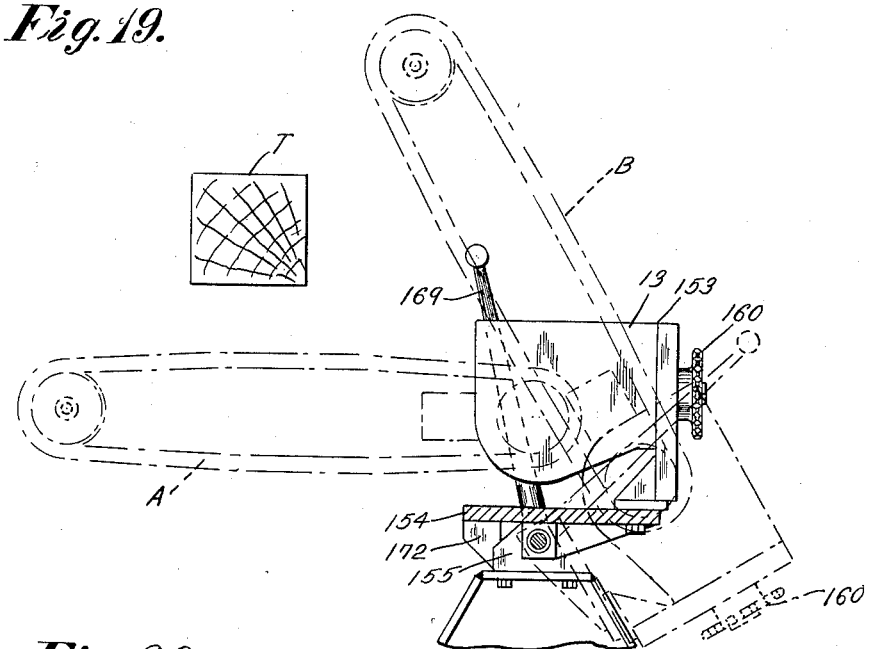
Fig. 19 is a fragmentary side view, with parts shown in vertical section, illustrating different operating positions of the saw.
Figure 20:
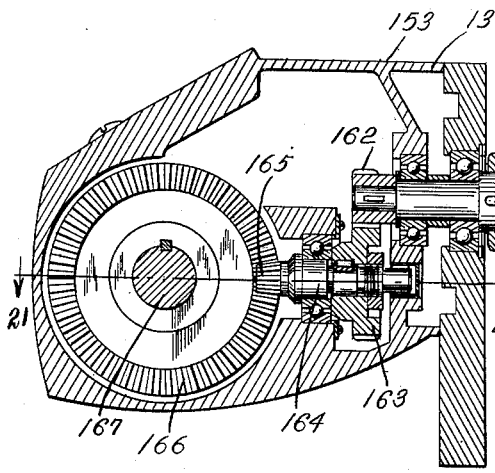
Fig. 20 is an enlarged detail vertical section taken on line 20—20 of Fig. 17.
Figure 21:
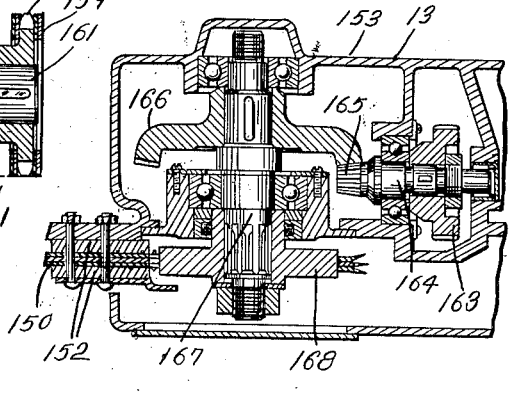
Fig. 21 is a detail horizontal section taken on line 21—21 of Fig. 20.

The turntable 6 is mounted in a relatively low position below the top of the base frame on a hollow forward projection 60 of the base frame, and the turntable mounting comprises a circular plate 61 (Figs. 3 and 4) secured, as by screws, in a horizontal position to the top of the frame-projection 60, and a retaining ring 62 secured, as by screws, to the plate 61 has an inwardly directed annular flange 63 overlying a peripheral flange 64 on the frame 65 of the turntable. Secured, as by screws, to the bottom of the plate 61 within the hollow frame projection 60 is a gear housing 66, and a vertical shaft (Fig. 3) suitably fixed centrally to the turntable frame projects downwardly into the gear housing in the manner shown. The shaft 67 is journaled in a bearing 68 suitably supported with the gear housing, and keyed to the shaft 67 below the bearing is a worm wheel 69 (see also Fig. 7) with which a worm 70 meshes (see also Fig. 4). The worm 70 is formed integral with a horizontal shaft 71 arranged transversely of and suitably journaled on bearings supported within the housing. The shaft 71 projects outwardly from the housing and has fixed thereto a chain sprocket 72 which is connected by an endless drive chain 73 to a drive sprocket 74 secured to the power shaft of a conventional reversible hydraulic motor 75 carried by the base frame. When the motor 75 is suitably operated, the turntable 6 may be rotated in one direction or the other, and when the motor is stopped the worm gearing 69, 70 serves to lock the turntable in its position of adjustment. The elevator boom may be swung horizontally by rotation of the turntable between right angle positions at either side of the machine. The control valve means for the motor 75 will be later described.

In this improved construction, suitably secured to the top of the turntable frame 65 are members 77 (Figs. 3 and 4) providing guideways 78 which slidingly receive guides 79 integral with the sliding support 7. Arranged above the guide-way-providing members 77 are horizontal fluid cylinders 80 (see also Fig. 6) pivotally connected at their rear ends at 81 on transverse axes to the turntable frame 65. Reciprocable in these cylinders are pistons 82 having their piston rods 83 extending outwardly from the cylinders and pivotally connected at their forward ends at 84 on upright axes to the sliding support 7. By pivotally connecting the cylinder and piston rods to the turnable frame and sliding support so that they may swing slightly both laterally and up and down, binding of the parts is avoided. When liquid under pressure is suitably supplied to the cylinders 80, the sliding support 7 may be moved along a rectilinear path horizontally back and forth along its guideways relative to the turntable. The control valve means for the cylinders 80 will be later described.

The boom type elevator or elevator boom 8 has spaced rear arm portions 86, 86 secured at 87 to a horizontal transversely disposed shaft 88. A sleeve 89 secured, as by welding, to the spaced boom arms 86 surrounds the shaft 88 and serves rigidly to brace the rear arm portions. The shaft 88 is arranged above the turntable 6, and is journaled at its ends in bearings 90 supported by upstanding brackets 91 integral with the sliding support 7 (see Fig. 4). Thus, the elevator boom 8 may swing in vertical planes relative to the sliding support and turntable. The boom frame is elongated and extends outwardly beyond the forward end of the base and carries the saddle 9 at its outer extremity. Supported at the top of the elevator boom are transverse guide rollers 93 spaced lengthwise of the boom frame in a manner clearly shown in Fig. 3. These guide rollers are each journaled at 94 (Fig. 5) on a shaft 95 secured to a bracket 96, the latter being fixed, as by screws, to the top of the boom frame. As shown in Fig. 5, the boom frame is of a boxlike fabricated welded construction to combine rigidity with light weight and is open at its bottom throughout its length. The boom frame may be swung in vertical planes upwardly on its pivotal mounting by a hydraulic cylinder 98 mounted in a cylindrical portion 99 of the sliding support. The cylinder 98 is arranged centrally between the cylinders 80 in parallelism therewith (Figs. 4 and 6), and reciprocable in the cylinder 98 is a piston 100 having its piston rod 101 extending forwardly through the packed front cylinder head. The forward portion of the piston rod is slidably received in a guide 102 carried by the sliding support, and pivotally connected to the piston rod at 103 is a cross frame or equalizer yoke 104 swingable in horizontal planes and having flexible chain sections 105 attached at 106 at its ends. These chain sections pass around curved segmental guides 107 (see also Fig. 14) detachably secured, as by screws, to the boom frame, and are attached at 108 to brackets 109 secured to the rearward end of the boom frame. When liquid under pressure is supplied to the rear end of the cylinder 98, the piston 100 is moved forwardly to swing the boom frame 8 upwardly about its pivot to elevate the timber receiving saddle 9, and when liquid is vented from the cylinder the boom frame may swing downwardly by gravity at a controlled rate. The control valve means for the cylinder 98 will be described later on.

In this illustrative construction, the timber receiving saddle 9 has a bottom frame 111 secured to a vertical shaft 112 swivelled in bearing sleeves supported within a bearing boss 113 secured to an outer frame 114. Extending longitudinally within the boom frame, as shown in Figs. 3 and 5, is an arm 115 of a light-weight, flat and relatively wide, fabricated welded construction, arranged in the opening in the boom, and this arm is pivotally connected at its rear end at 116 to upstanding lugs 117 herein integral with the cylinder support 99, and this arm is pivotally connected at its front end at 118 to the outer frame 114 which carries the saddle. The four pivots of the boom frame and arm are equally spaced at the corners of a parallelogram, and the boom frame and arm cooperate to provide a parallel motion arrangement whereby the saddle is maintained horizontal irrespective of the angular position of the boom frame. The structure of the saddle per se may be similar to that fully disclosed in a copending application to C. F. Ball, Ser. No. 24,534, filed May 1, 1948, now Patent No. 2,574,857, granted November 13, 1951, and includes a swivelled timber receiving platform or turntable 119.

In this improved construction, the adjustable bottom 11 of the compartment 10 comprises a rectangular horizontal plate 121 which extends laterally nearly the full width of the compartment and extends longitudinally nearly the full length of the compartment, as shown in Figs. 8 to 11 inclusive. This horizontal plate receives the timber load, and, when in lowered position, rests on horizontal cross members 122 spaced longitudinally of the compartment and secured to vertical plates 123 providing the side walls of the compartment. Pivotally mounted on transverse pivot shafts 124 secured to the side plates 123 are front and rear lever arms 125 and 126 in the form of bell cranks, and the parallel side portions 127 of each lever arm are transversely braced by tubular cross rods 128 welded thereto. The side portions of the front lever arm 125 carry at their upper ends a transverse pivot rod 130 which passes through the upper tubular brace 128 and which pivotally engages at 131 bearings 132 supported within bearing supports 133 secured as by welding (Fig. 16) to channel-like side members 134 in turn welded to the bottom of the horizontal plate 121 (Figs. 10 and 11). The side portions of the rear lever arm 126 carry within the upper tubular brace 128 (Fig. 15) a transverse shaft 135 which at its ends supports bearings 136 on which rollers 137 are journaled. These rollers are engaged in longitudinal guideways 138 provided at the inner sides of the channel-like side members 134 (Fig. 11). Pivotally mounted on transverse axes on brackets 140 secured to the base frame to swing in vertical planes are front and rear fluid cylinders 141 and 142 respectively containing reciprocable pistons 143 and 144 having their piston rods 145 projecting outwardly from the cylinders and pivotally connected at 146 and 147 respectively on parallel axes to the lower ends of the lever arms. When the bottom plate 121 is in its lowered position shown in Figs. 8 and 10, and fluid under pressure is suitably supplied to the rear ends of the cylinders, the lever arms 125 and 126 may be swung in unison about their pivots to move the bottom plate upwardly through a series of parallel horizontal planes to its elevated position shown in Figs. 9 and 10. The cylinders are provided with separate control valves so that the cylinders may be independently operated to effect, by proper control, maintenance of the horizontal position of the bottom plate in the event that the weight of the timber load is heavier at one end of the plate than at the other, and to tilt the plate to position it horizontally in the event the base of the machine is inclined endwise slightly with respect to the horizontal. By trapping fluid in the cylinders, the bottom plate may be held in its adjusted position, and when the cylinders are vented, the bottom plate may be lowered at a controlled rate. The control valves for the lifting cylinders will later be described. This elevating structure for the compartment bottom is being claimed in a divisional application, Ser. No. 234,632, filed June 30, 1951.

The saw mechanism 13 is shown in detail in Figs. 17 to 21 inclusive, and includes a guide bar or saw blade 150 disposed in vertical planes transversely of the base frame in advance of the compartment 10 (see Figs. 1 and 2), and an endless toothed saw chain 151 of a conventional pivoted link construction is guided for circulation in an orbital path about the margin of the bar. The bar is mounted on a hanger 152 suitably secured to a casing 153 which is secured to a bottom plate 154 which is pivotally mounted on a bracket 155 (Fig. 18) carried by a horizontal plate 156 suitably secured to the base frame. Carried by the swingable casing 153 is a conventional hydraulic motor 157 which has a drive sprocket 158 suitably secured to its power shaft, and this sprocket is connected by an endless drive chain 159 to a chain sprocket 160 (Fig. 20) fixed to a shaft 161 suitably journaled in bearings supported within the casing 153. Secured to and driven by the shaft 161 is a spur gear 162 which meshes with a spur gear 163 keyed to a parallel shaft 164 likewise journaled in bearings supported within the casing. Secured to the shaft 164 is a bevel pinion 165 which meshes with a large bevel gear 166 (see also Fig. 21) keyed to a transverse shaft 167 suitably journaled in bearings supported within the casing. Fixed to the shaft 167 is a chain drive sprocket 168 which engages and drives the endless saw chain 151. An upstanding lever 169 is secured to the casing 153 to swing therewith and projects upwardly through a transverse slot 170 formed in a top cover 171 suitably attached to the top of the base frame. The lever 169 may be manually swung to swing the casing 153, thereby to swing the saw in vertical planes upwardly through the slot 170 from the position shown in Fig. 18, and indicated in dotted lines at A in Fig. 19, to the raised position shown at B in Fig. 19. A suitable stop 172 (Fig. 18) is provided to limit downward swing of the saw by engagement with the bottom of the plate 154. The top of the base frame at the side of the machine at which the saw is located carries a series of transverse rollers 173, and a timbering element located at the level of the tops of the rollers and designated T in Figs. 17 and 18 may be slid laterally from the compartment bottom plate onto these rollers, and a timbering element thus supported on the rollers may be easily moved endwise into proper sawing relation with the saw. Thus the timbering elements may be readily sawed to the desired prop lengths.

The floor engaging jacks 14 comprise vertical cylinders 175 secured in brackets 176 attached to the sides of the projecting portion 60 of the machine frame, and these cylinders contain reciprocable pistons having their piston rods 177 projecting downwardly and each connected through a ball and socket connection to a floor engaging plate 178. Separate control valves are provided for independently operating the jacks, as will later be described. When the fluid is trapped in the jack cylinders the pistons may be locked in either their raised or lowered position.

The cable reel 18 may be driven by a conventional hydraulic motor 180 and may have a control device 181 associated therewith whereby, when the timber setting machine is propelled forwardly into the mine passageway or tunnel, the electric conductor cable wound on the cable reel may be drawn off the reel while maintained under the desired tension. When the timber setting machine is propelled rearwardly the cable reel is driven by this motor at the desired cable winding speed. Since the particular structure of this reel does not enter into the present invention, and its control device is fully disclosed in a copending application to C. F. Ball et al., Ser. No. 731,126, filed February 26, 1947, further description thereof is herein unnecessary.

The motor driven pump 16 is adapted to supply liquid under pressure to the various hydraulically operated devices above described, and a control valve mechanism, as will soon be described in detail, is provided for controlling the flow of liquid under pressure relative to the hydraulic motors of the devices. Also, the electric motors 15 and 17 are provided with conventional electrical control apparatus, and since such electrical control apparatus is conventional and well known, detailed description and illustration thereof are omitted.

Figure 22:
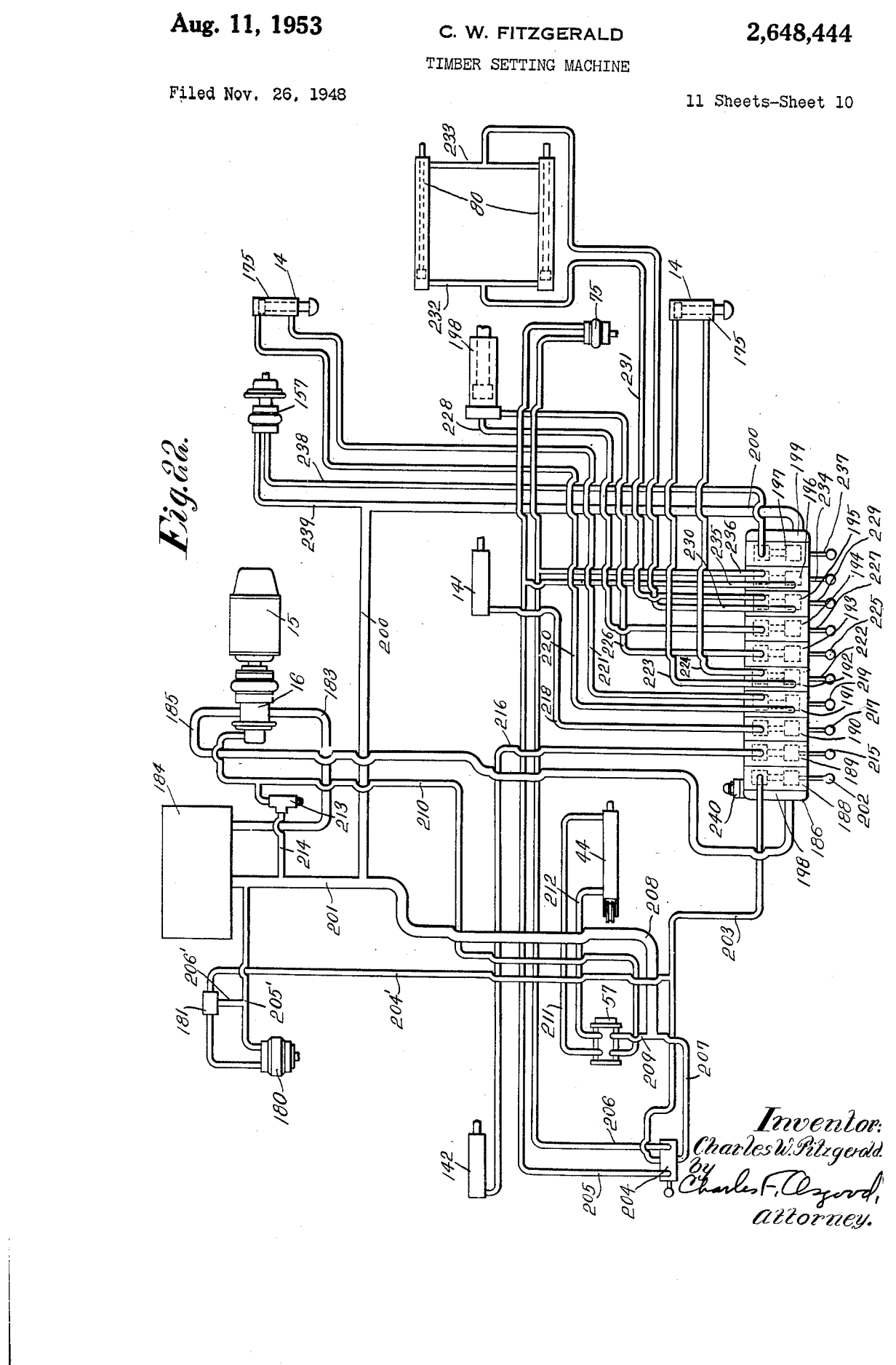

The hydraulic system and associated control valve mechanism, as shown diagrammatically in Fig. 22, includes the pump 16 driven by the motor 15. The pump is of the dual or tandem type and has its suction side connected by a conduit 183 to a liquid tank 184 carried by the base, and one discharge side of the pump is connected by a conduit 185 to the pressure passage of the valve box 186 of a conventional control valve mechanism of the balanced sliding spool type. This valve box is located at one side of the machine within a chamber 187 formed within the side of the base frame intermediate the front and rear wheels, as shown in Figs. 1 and 2. This valve box is made up of valve block sections 188, 189, 190, 191, 192, 193, 194, 195, 196 and 197, and inlet and discharge end sections 198 and 199, and the valve blocks and end sections are suitably maintained in assembled relation. The conduit 185 is connected to the chamber of the inlet section 198, and the chamber of the discharge section 199 is connected by a branch conduit 200 to a return conduit 201 leading back to the tank. The valve block 188 has a bore containing a slide valve 202, and the bore is connected by a conduit 203 to a tramming control valve 204 located at the tramming station S and which is in turn connected by conduits 205 and 206 to the opposite sides of the hydraulic motor 75 for rotating the turntable 6. A conduit 204' connected to the conduit 203 leads through the control device 181 to the intake side of the hydraulic motor 180 which drives the cable reel 18, and the discharge side of the reel motor is connected by a conduit 205', to the return conduit 201. The control device is connected by a conduit 206', to the return conduit 205'. The tramming control valve 204 for the turntable rotation motor is connected by a conduit 207 to a return conduit 208 connected to the conduit 201 leading back to the tank, and a return conduit 209 leads from the steering control valve 57 to the conduit 208 so that the latter provides a common return for both valves. The other discharge side of the tandem pump is connected by a conduit 210 to the steering control valve 57, and this valve controls fluid flow through conduits 211 and 212 to the opposite ends of the steering cylinder 44. The conduit 210 has a relief valve 213 connected therein for discharging excessive pressures in the event of overload through a branch conduit 214 leading to the return conduit 201. The valve block 189 has a bore containing a slide valve 215, and the bore is connected by a conduit 216 to the rear cylinder 142 of the lifting device for the compartment bottom 11, and the valve block 190 has a bore containing a slide valve 217, and the bore is connected by a conduit 218 to the front cylinder 141 of the lifting device. The valve block 191 has a bore containing a slide valve 219, and the bore is connected by conduits 220 and 221 to the opposite ends of the cylinder 175 of one of the floor jacks 14. The bore of the valve block 192 contains a slide valve 222, and is connected by conduits 223 and 224 to the opposite ends of the cylinder 175 of the other floor jack 14. The bore of the valve block 193 contains a slide valve 225, and is connected by a conduit 226 to a safety lock device for the boom lifting cylinder 198 for reducing the possibility of inadvertent dropping of the loaded elevator boom in a manner fully disclosed in a copending application to one J. D. Russell, Ser. No. 33,890, filed June 18, 1948, now matured into Patent No. 2,570,383, granted October 9, 1951. The valve block 194 has a bore containing a slide valve 227, and the bore is connected by a conduit 228 to the boom lifting cylinder 198. The bore of the valve block 195 contains a slide valve 229, and is connected by conduits 230 and 231 and branch conduits 232 and 233 to the opposite ends of the cylinders 80 for shifting the sliding support 7. The valve block 196 has a bore containing a slide valve 234 and connected by conduits 235 and 236 respectively to the conduits 205 and 206 leading to the turntable rotating motor 75. The bore of the valve block 197 contains a slide valve 237 and is connected by a conduit 238 to the intake side of the saw motor 157. The discharge side of the saw motor is connected by a conduit 239 to the return conduit 200. The valve box 186 has a conventional relief valve device 240 for relieving excessive pressures in the fluid system in the event of overload by connecting the pressure passage of the valve box with the discharge conduit 200.

The general mode of operation of the improved timber setting machine is as follows. A load of roof timbering elements T, such as cross timbers and props, may be loaded on the lowered bottom 11 of the compartment 10 in the piled-up relation shown in Fig. 10. The machine may be propelled about the mine or tunnel by the front propelling wheels 4 driven by the motors 17, and during tramming the operator occupies the station S on the machine in a convenient position to operate the steering wheel 49, the tramming control valve 204 for the turntable rotating motor 75, and the control for the four wheel brakes. By turning the steering wheel 49 in the proper direction, the steering control valve 57 may be actuated to supply liquid under pressure to one end or the other of the steering cylinder 44 to effect turning of the steering wheels 4 and 5 in the desired direction. As the machine travels through the sharply curved passageways of a mine or tunnel, the operator may manipulate the tramming control valve 204 for the turntable rotating motor 75 to swing the elevator boom laterally in one direction or the other to facilitate movement of the machine around the sharp cornesr When the timber setting machine is suitably positioned with respect to the work, and it is desired to set a cross timber against the roof, the elevator boom 8 assumes the horizontal position shown in Figs. 1 and 2, and the machine operator at that time stands at the side of the machine near the valve box 186 and may effect the supply of liquid under pressure to the floor jacks 14 under the control of the slide valves 219 and 222 to move the same into engagement with the floor and then liquid under pressure may be supplied to the lifting cylinders 141 and 142 under the control of the slide valves 215 and 217 to elevate the compartment bottom 11 to bring the top row of timbering elements to the desired elevation. In the event the timber load weight is greater on one lifting cylinder than on the other, the valves 215 and 217 may be separately operated in a manner to maintain the compartment bottom in a horizontal position, and the valves may also be operated to tilt the compartment bottom to level the timber load in the event the machine base is inclined in an endwise direction. A cross timber in longitudinal alinement with the horizontal elevator boom may then be moved endwise along the bottom plate 121 onto the rearmost roller 33 of the elevator boom in the manner shown in Fig. 2, and the timber is then moved endwise along the boom rollers onto the timber receiving saddle 9. When the timber is properly positioned on the saddle, the operator may manipulate the slide valve 227 to effect supply of liquid under pressure to the boom lift cylinder 198 to swing the boom upwardly a slight distance to elevate the saddle so that the timber thereon may clear the top of the base frame and the timber may be turned to a crosswise position, as indicated in dotted lines in Fig. 1. The lift cylinder 198 may then be operated under the control of the slide valve 227 to swing the elevator boom upwardly to bring the timber thereon against the roof and to hold it there in the manner shown in Fig. 23. During elevating and positioning of the cross timber, or subsequent to the placing of the cross timber against the roof, a timber may be moved laterally from the compartment onto the rollers 173 at one side of the base frame, and the timber may then be rolled endwise to bring the same into proper sawing relation with the saw mechanism 13 so that the timber may be cut to the proper prop length, and the props may be set in place to secure the cross timber firmly against the roof. Evidently, during elevation of a timber, liquid under pressure may be supplied to the cylinders 83 under the control of the slide valve 229 to slide the support 7 rectilinearly back and forth in a horizontal direction and to the turntable rotating motor 75 under the control of the slide valve 234 to position the saddle horizontally to locate the timber in the desired position with respect to the roof. By moving the slide valve 227 to connect the cylinder 198 to exhaust, the elevator boom may be lowered at a controlled rate. The compartment bottom may be elevated by the lift cylinders 141 and 142 as the timbers are removed therefrom so that the poled-up timbers may be disposed at different heights in the compartment, as shown in Figs. 10 and 11, thereby reducing the necessity of manually handling the timbers.

When it is desired to set a cross timber diagonally against the roof across the entry, as shown in Fig. 24, the timber setting machine is located near one rib, as shown, and the floor jacks 14 are moved into engagement with the floor. The elevator boom 8 may then be lowered into a horizontal position in alinement with the base and a properly cut timber may be rolled out endwise from the compartment along the elevator boom 8 onto the saddle 9. The elevator boom is then swung upwardly a slightly distance so that the timber clears the top of the base frame, and the timber may then be positioned diagonally by turning the saddle, as shown, and raised into position against the roof and set in place. In Fig. 25, the timber setting machine is shown in a position for setting cross timbers against the roof of a passageway P, such as a cross cut or room neck, extending laterally from the main entry. During this operation, the machine is angularly positioned in the entry, as shown, and the elevator boom 8 is positioned first in horizontal alinement with the base and a timber is moved endwise from the compartment along the elevator boom onto the timber saddle. The elevator boom is then lifted a slight distance so that the timber clears the top of the base frame, and is thereafter swung laterally about the turntable axis to the position shown, and when the timber is properly positioned it is moved up against the roof and set in place. Various other manners of use of the machine will be clearly apparent to those skilled in the art.

As a result of this invention, an improved timber setting machine is provided which serves to transport the roof timbering elements about the mine or tunnel and embodies novel saw mechanism for cutting the timbers to the proper prop lengths, and an improved mechanical elevator apparatus for raising the timbers against the roof and for holding the timbers in position during setting of the props. By the provision of the mechanical lifting device embodied in the machine, the timber load in the machine compartment may be lifted into a position wherein the timbers may be received on the saddle of the elevator boom and to be moved laterally in sawing relation with the saw mechanism, thereby minimizing the need for manually lifting the timbers. The timber lifting device, by the provision of the independently operable lifting cylinders, may be maintained in a horizontal position even when the timber load on one cylinder is greater than on the other and may be tilted to maintain the timber load level in the event the base of the machine is inclined endwise with respect to the horizontal. By the provision of a timber setting machine of the design disclosed, not only may the cross timbers be quickly set in place against the mine or tunnel roof, but also the need for manually handling the mine timbers is substantially reduced. The novel propelling and steering means renders the propelling and steering of the machine extremely flexible, not only permitting the machine to traverse an uneven floor surface, but also enabling sharp turning of the machine to permit negotiation of the sharply curved passageways encountered in an underground mine or tunnel. The novel control means for the various hydraulically operated devices of the machine enables the operator to control the machine from a tramming station on the machine or at a timber setting station at one side of the machine, thereby greatly increasing the flexibility of control. The machine is extremely low and compact, well adapted to use in mines or tunnels having low head room. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a timber setting machine, a mobile base having a frame provided with a forward horizontal projection in a relatively low position at one end thereof, fluid operated jack devices carried by said projection at the sides thereof and engageable with the floor for steadying said frame, a horizontal turntable mounted in a relatively low position on said projection with the top of said turntable disposed below the top of said base, a support guided on said turntable for horizontal rectilinear movement relative thereto, an elevator boom pivotally mounted on said support to swing in vertical planes relative thereto about a horizontal axis located above said turntable and below the top of said base, said elevator boom carrying a timber receiving saddle at its outer extremity when in a horizontal position disposed below the top of said base, fluid operated means for rotating said turntable, fluid operated means for moving said support horizontally along its guideway, fluid operated means for swinging said elevator boom about its pivot, and remote control means on said base for controlling the supply of operating fluid to said jack devices and said several fluid operated means.

2. In a timber setting machine, a mobile base having a tramming station for the operator at one end thereof, a horizontal turntable mounted on said base at its opposite end, an elevator boom pivotally mounted on said turntable to swing in vertical planes with respect thereto and carrying a timber receiving saddle at its outer extremity, fluid operated means for rotating said turntable, fluid operated means for swinging said elevator boom about its pivot, a source of fluid under pressure embodied in said base, control valve means located at the operator's tramming station on the machine for controlling the flow of fluid under pressure from said source to said turntable rotating means, and control valve means located at a station at the side of the machine whereby the operator may also control fluid flow from said source to said turntable rotating means as well as said elevator boom swinging means while standing at one side of the machine.

3. In a timber setting machine, the combination comprising a mobile base having a body, a timber elevating apparatus disposed at one end of said base and including a swingable boom carrying a timber receiving saddle and when lowered disposed in a horizontal position close to the top of said body, said base having a compartment of substantial depth below the top of said body and extending longitudinally thereof centrally between the sides of said body for receiving a load of mine timbering elements, said compartment having an adjustable bottom for elevating the timber load, and said bottom when lowered disposed a substantial distance below the lowered horizontal boom, said elevator boom having timber guiding means whereby a timber received thereby may be moved endwise along said boom onto said saddle, and said compartment bottom when fully elevated disposed in substantial endwise alignment with said horizontal elevator boom whereby a timber may be moved endwise from said compartment bottom directly onto said guiding means of said elevator boom and onto said saddle without bodily lifting of the timber.

4. A timber setting machine as set forth in claim 3 wherein said guiding means of said elevator boom, when said boom is in its lowered horizontal position, is disposed at the top of said body and said compartment bottom when fully elevated is disposed at the top of said compartment at the same level as said guiding means with the timbers on said compartment bottom then located above the top of said body whereby a timber may be moved endwise directly from said compartment bottom onto said guiding means as aforesaid.

5. In a timber setting machine, a mobile base having a compartment extending centrally longitudinally thereof and adapted to receive a load of mine timbering elements, a timber elevating apparatus arranged on said base at one end of said compartment and including a timber receiving saddle, a timber guide arranged at one side of the top of said base for receiving a timber moved laterally from said compartment, a saw mechanism carried by said base including a saw arranged transversely of said base between said end of said compartment and said timber elevating apparatus, a timber on said guide being movable endwise into sawing relation with said saw into the path of movement of the latter, and said saw being movable in transverse vertical planes to cross cut the timber in its path, and guiding means provided by said elevating apparatus disposable at substantially the same level as said timber guide for guiding a sawed timber during its movement from said compartment onto said saddle.

6. In a timber setting machine, a mobile base having a compartment extending centrally longitudinally thereof and adapted to receive a load of mine timbering elements, a timber elevating apparatus arranged on said base at one end of said compartment and including a timber receiving saddle, a timber guide arranged at one side of the top of said base for receiving a timber moved laterally from said compartment, elevating devices associated with said compartment for lifting the timbers therein into a position to be moved laterally onto said timber guide, a saw mechanism carried by said base including a saw arranged transversely of said base between said end of said compartment and said timber elevating apparatus, a timber on said guide being movable endwise into sawing relation with said saw into the path of movement of the latter, and said saw being movable in transverse vertical planes to cross cut the timber in its path, and guiding means provided by said elevating apparatus disposable at substantially the same level as said timber guide for guiding a sawed timber during its movement from said compartment onto said saddle.

7. In a timber setting machine, a mobile base having a timber receiving compartment extending longitudinally centrally thereof and adapted to receive a load of mine timbering elements, an elevator boom pivotally mounted on said base at one end of said compartment, said boom carrying a timber receiving saddle at its outer extremity, a saw mechanism carried by said base and including a saw arranged transversely of said base between said end of said compartment and said elevator boom, said boom disposable in a horizontal position in alinement with said base, a roller guide on said boom for guiding a timber endwise from said compartment onto said saddle, and a roller guide at one side of said base for receiving a timber moved laterally from said compartment and for guiding the timber thereon in an endwise direction relative to said saw whereby the latter may cross cut the timber, said roller guides, when in timber receiving position, disposed at substantially the same level as the top of said base whereby a timber may be moved from one to the other without bodily lifting of the timber.

8. In a timber elevating apparatus for a timber setting machine, a pivoted, elongated elevator boom of inverted U-shape in cross section having a chamber extending longitudinally thereof and opening through the bottom of said boom, means for pivotally mounting said boom to swing in vertical planes about a horizontal axis, a support pivotally mounted on the outer extremity of said boom to rock about an axis parallel with the boom pivot axis, a horizontal timber receiving saddle carried by said support, a flat and relatively wide arm extending longitudinally in said longitudinal boom chamber in substantial parallelism with said boom and pivoted at its rear end and pivotally connected to said support at its outer end, the four pivots of said boom and arm arranged at the corners of a parallelogram so that said boom and arm cooperate to provide a parallel motion connection for said support whereby said saddle is maintained horizontal irrespective of the position of said boom about its pivot, said boom having side projections extending below the sides of the U at its rear end, said projections disposed at the sides of said arm, and power operated means connected to said side projections and located beneath said boom for swinging the latter about its pivot.

9. In a timber setting machine, a mobile base, a horizontal turntable mounted in a relatively low position on said base with its top surface disposed a substantial distance below the top of said base, an elevator boom pivotally mounted on said turntable on a transverse horizontal axis located above said turntable and below the top of said base, a timber receiving saddle carried at the outer extremity of said boom, said boom being swingable into a horizontal position about its pivot below the top of said base to locate said saddle at substantially the same level as the top of said base whereby a timber disposed at the top of said base may be moved endwise onto said saddle without bodily lifting of the timber, a fluid cylinder carried by said turntable below said boom pivot, and a piston reciprocable in said cylinder and operatively connected to the rear end of said boom for swinging the latter about its pivot.

10. In a timber setting machine, a mobile base having a horizontal projection at one end thereof near the bottom of the base, a horizontal turntable mounted in a relatively low position on said bottom projection of said base with its top surface disposed a substantial distance below the top of said base, parallel horizontal guideways mounted on said turntable at the sides thereof and spaced equidistantly from the center of the turntable, a horizontal support guided for horizontal rectilinear movement along said guideway, an elevator boom pivotally mounted on said support on a horizontal transverse axis disposed at the top of said support and below the top of said base, said boom being swingable about its pivot into a horizontal position below the top of said base and carrying a timber receiving saddle at its outer extremity, horizontally disposed extensible fluid devices arranged in parallelism at the tops of said guideways and operatively connected between said turntable and said support for moving the latter back and forth along its guideways, and a horizontally disposed extensible fluid device arranged on said support beneath said boom pivot centrally between said parallel fluid devices and operatively connected to said boom for swinging the latter.

11. In a timber setting machine, the combination comprising a mobile base having a tramming station for the operator at one end thereof, an elevator boom pivotally mounted on said body at the opposite end thereof, remote from said tramming station, to swing horizontally relative to said base about an upright axis, said elevator boom carrying a timber receiving saddle at its outer extremity, power operated means for swinging said elevator boom horizontally about said upright axis, control means located at the operator's tramming station on said base for controlling the flow of power medium to said power operated swinging means for said elevator boom, and control means located at a station spaced longitudinally of said base from said tramming station whereby the operator may also control flow of power medium to said power operated swinging means for said elevator boom, whereby the operator may control horizontal swing of said elevator boom from two spaced points with respect to the base either while riding on the base or while standing at one side of said base.

12. A timber setting machine as set forth in claim 11 wherein said power operated swinging means for said elevator boom is fluid actuated and said remotely spaced control means each comprises a control valve for controlling the flow of operating fluid to said swinging means, said pair of control valves provided with individual operating elements whereby said valves may be separately actuated.

13. In a timber setting machine, the combination comprising a mobile base having a body for receiving mine timbers, said body having a horizontal, supporting surface, a horizontal turntable mounted in a relatively low position on said supporting surface, an elevator boom carried by said turntable to swing in vertical planes with respect thereto about a horizontal transverse axis and carrying a timber receiving saddle at its outer extremity, means for swinging said elevator boom about its pivot, said elevator boom disposable in a substantially horizontal position below the top of said body with said saddle positioned beyond said end of said body at a level substantially even with the top of said body whereby a timber may be moved longitudinally from said body onto said saddle without bodily lifting of the timber, said turntable carrying longitudinal guideways and a support guided for horizontal movement back and forth along said guideways and on which said elevator boom is pivotally supported, said turntable and said support both located below the top of said body, and power operated means for moving said support back and forth along said guideways for varying the horizontal position of said saddle with respect to said body.

14. In a timber setting machine, the combination comprising a mobile base having propelling and steering means and provided with a tramming station for the operator at one end of said base, an elevator boom pivotally mounted on the opposite end of said base to swing horizontally relative thereto about a vertical axis and carrying a timber receiving saddle at its outer extremity, said boom extending longitudinally outwardly from said base, fluid operated means for swinging said boom horizontally about its pivotal axis, a source of fluid under pressure, control valve means located at the operator's tramming station on the machine for controlling fluid flow from said source to said boom swinging means, and control valve means located at a station at one side of the machine at a point remote from said tramming station whereby the operator may also control fluid flow from said source to said boom swinging means, thereby to enable swinging of said boom both during tramming of the machine about the mine and during the timber setting operation.

15. In a timber setting machine, a mobile base, a floor jack device carried by said base at one end thereof and engageable with the floor for steadying said base during the timber setting operation, an elevator boom pivotally mounted on said send of said base to swing horizontally about a vertical axis and to swing in vertical planes about a horizontal axis, means for mounting said elevator boom for horizontal rectilinear movement relative to said base, said elevator boom carrying a timber receiving saddle at its outer extremity, fluid operated means for swinging said elevator boom horizontally about its vertical pivot, fluid operated means for swinging said elevator boom in vertical planes about its horizontal pivot, fluid operated means for moving said elevator boom rectilinearly, and remote control means on said base and located longitudinally of said base at points remote from said jack devices and said elevator boom for controlling the supply of operating fluid to said floor jack device and respectively to said several fluid operated means.

16. In a timber setting machine, the combination comprising a mobile base adapted to support a load of mine timbers at its top, a horizontal turntable mounted at one end of said base, a support mounted on said turntable for horizontal rectilinear movement relative thereto, an elevator boom pivotally mounted on said support to swing in vertical planes relative thereto about a horizontal axis, said elevator boom carrying a timber receiving saddle at its outer extremity, said boom when in horizontal timber receiving position disposed below the top of said base with said saddle located at a level substantially even with the top of said base in a position to receive a timber from the top of said base, fluid operated means for rotating said turntable, fluid operated means for moving said support rectilinearly along its guideway, fluid operated means for swinging said boom in vertical planes about its pivot, a source of fluid under pressure on said base, and remote control means on said base for controlling the flow of operating fluid from said source respectively to said several fluid operated means.

17. In a timber setting machine, the combination comprising a mobile base having propelling and steering means and provided with a tramming station for the operator at one end of said base, an elevator boom pivotally mounted on the opposite end of said base to swing horizontally relative thereto about a vertical axis and carrying a timber receiving saddle at its outer extremity, said boom extending longitudinally outwardly from said base, power operated means for swinging said boom horizontally about its pivotal axis, a power source on said base, operator controllable control means located at the operator's tramming station on the base for controlling flow of power medium from said source to said boom swinging means, and operator controllable control means located at a station at one side of the machine at a point remote from said tramming station whereby the operator may also control flow of power medium from said source to said boom swinging means, thereby to enable swinging of said boom both during tramming of the machine about the mine and during the timber setting operation.

18. In a timber setting machine, the combination comprising a mobile base adapted to support a load of mine timbers at its top, a horizontal turntable mounted at one end of said base, a support mounted on said turntable for horizontal rectilinear movement relative thereto, an elevator boom pivotally mounted on said support to swing in vertical planes relative thereto about a horizontal axis, said elevator boom carrying a timber receiving saddle at its outer extremity, said boom when in lowered horizontal timber receiving position disposed below the top of said base with said saddle located at a level substantially even with the top of said base in a position to receive a timber from the top of said base, power operated means for rotating said turntable, power operated means for moving said support rectilinearly along its guideway, power operated means for swinging said boom in vertical planes about its pivot, a power source on said base, and remote control means on said base and controllable by the operator for controlling the flow of power operating medium from said source respectively to said several power operated means.

CHARLES W. FITZGERALD.

(References on following page)

References Cited in the file of this patent

UNITED STATES PATENTS

| Number | Name | Date |
|---|---|---|
| 105,883 | Bailey | Aug. 2, 1870 |
| 717,820 | Cunningham | Jan. 6, 1903 |
| 1,755,738 | Klepadlo et al. | Apr. 22, 1930 |
| 1,813,291 | Herbold | July 7, 1931 |
| 1,979,265 | Holmes | Nov. 6, 1934 |
| 2,176,170 | Flowers | Oct. 17, 1939 |
| 2,313,084 | Manly | Mar. 9, 1943 |
| 2,369,838 | Minnis | Feb. 20, 1945 |
| 2,377,279 | Stewart | May 29, 1945 |
| 2,381,731 | Erdahl | Aug. 7, 1945 |
| 2,408,387 | Gay et al. | Oct. 1, 1946 |
| 2,413,096 | Barker | Dec. 24, 1946 |
| 2,427,038 | Ashman | Sept. 9, 1947 |
| 2,467,113 | Deiters | Apr. 12, 1949 |
| 2,471,901 | Ross | May 31, 1949 |
| 2,488,520 | Beck | Nov. 22, 1949 |
| 2,492,608 | Wilms | Dec. 27, 1949 |